United States Patent [19]

Ludwig

[11] 3,951,689

[45] Apr. 20, 1976

[54] ALKALI METAL/SULFUR CELL WITH GAS FUEL CELL ELECTRODE

[75] Inventor: Frank A. Ludwig, Southfield, Mich.

[73] Assignee: Ford Motor Company, Dearborn, Mich.

[22] Filed: Aug. 20, 1975

[21] Appl. No.: 605,942

[52] U.S. Cl............................ 136/86 A; 136/6 FS; 136/83 T
[51] Int. Cl.$^2$......................................... H01M 8/12
[58] Field of Search................ 136/6 FS, 83 T, 86 A

[56] References Cited
UNITED STATES PATENTS

| | | | |
|---|---|---|---|
| 3,756,856 | 9/1973 | Tennenhouse | 136/6 FS |
| 3,852,114 | 12/1974 | Dubin | 136/83 T |

Primary Examiner—John H. Mack
Assistant Examiner—H. A. Feeley
Attorney, Agent, or Firm—Roger L. May; Keith L. Zerschling

[57] ABSTRACT

An improved alkali metal/sulfur cell of the type including: (A) at least one anodic reaction zone containing a molten alkali metal reactant-anode in electrical contact with an external circuit; (B) at least one cathodic reaction zone including an electrode of porous conductive material and in which, during discharge of the cell, cations of the alkali metal combine with polysulfide or sulfur-saturated polysulfide ions to form reduced alkali metal polysulfide salts which at least partially fill said porous conductive material; and (C) a cation-permeable barrier to mass liquid transfer interposed between and in contact with said anodic and cathodic reaction zones, said porous conductive material being in electrical contact with both said cation-permeable barrier and said external circuit. The improvement comprises adapting the cathodic reaction zone to operate as a gas fuel cell electrode by employing a sulfur storage chamber containing molten sulfur connected with said cathodic reaction zone so as to allow sulfur vapors to pass therebetween, the storage chamber being adapted to be maintained at a temperature i. above the temperature of said cathodic reaction zone when said cell is being discharged such that sulfur distills into said cathodic reaction zone and ii. below the temperature of said cathodic reaction zone when the cell is being charged such that sulfur vapor condenses in said storage chamber. The application also relates to a process for reducing alkali metal polysulfide salts to form elemental alkali metal using said cell.

27 Claims, 3 Drawing Figures

ALKALI METAL/SULFUR CELL WITH GAS FUEL CELL ELECTRODE

The invention herein described was made in the course of or under a contract or subcontract thereunder with the National Science Foundation.

This application relates to an improved alkali metal/sulfur cell. More particularly, this application relates to an improved cell of the type including: at least one anodic reaction zone containing a molten alkali metal reactant-anode; at least one cathodic reaction zone including a porous electrode and in which polysulfide or sulfur saturated polysulfide ions react with cations of said alkali metal during cell discharge to form reduced alkali metal polysulfides; and a cation-permeable barrier to mass liquid transfer interposed between said anodic and cathodic reaction zones.

Still more particularly, the application relates to an improved sodium/sulfur cell of increased capacity.

The application also relates to a process for reducing alkali metal polysulfide salts to form elemental alkali metal using said cell.

BACKGROUND OF THE INVENTION

A recently developed type of secondary or rechargeable electrical conversion device comprises: (1) an anodic reaction zone containing a molten alkali metal anode-reactant, e.g., sodium, in electrical contact with an external circuit; (2) a cathodic reaction zone containing (a) a cathodic reactant comprising a liquid electrolyte, e.g., sulfur or a mixture of sulfur and molten polysulfide, which is electrochemically reversibly reactive with said anodic reactant, and (b) a conductive electrode which is at least partially immersed in said cathodic reactant; and (3) a solid electrolyte comprising a cation-permeable barrier to mass liquid transfer interposed between and in contact with said anodic and cathodic reaction zones. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the surface of the porous electrode by reaction of the cathodic reactant with electrons conducted through the porous electrode from the external circuit. Because the ionic conductivity of the liquid electrolyte is less than the electronic conductivity of the porous electrode material, it is desirable during discharge that both electrons and sulfur be apppplied to and distributed along the surface of the porous conductive material in the vicinity of the cation-permeable solid electrolyte. When the sulfur and electrons are so supplied, polysulfide ions can be formed near the solid electrolyte and the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus electrons are removed from the alkali metal polysulfide by charge transfer at the surface of the porous electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur. As can be readily appreciated the production of large amounts of sulfur near the surface of the cation-permeable membrane has a limiting effect on rechargeability. This is the case since sulfur is nonconductive and when it covers surfaces of the porous electrode, charge transfer is inhibited and the charging process is greatly hindered or terminated. Thus, in order to improve the rechargeability of a cell of this type it is necessary not only to supply polysulfide to the surface of the porous electrode in the vicinity of the cation-permeable membrane, but also to remove sulfur therefrom.

U.S. Pat. No. 3,811,493 and U.S. Pat. application Ser. No. 545,048 filed Jan. 29, 1975 both disclose energy conversion device designs which allow or promote improved mass transportation of reactants and reaction products to and from the vicinity of the solid electrolyte and the porous electrode during both discharge and charge. In the device disclosed in the patent an ionically conductive solid electrolyte is located between a first reactant in one container and a second reactant in another container. An electrode for one of the reactants comprises a layer of porous, electronically conductive material having one surface in contact with one side of the ionically conductive solid electrolyte and the other surface in contact with a structurally integral electronically conductive member permeable to mass flow of its reactant and electrically connected to the external circuit. An open volume exists between the structurally integral conductive member and the container wall to promote free flow and mixing of the reactant. Reactants also flow readily through the conductive member into the layer of porous electronically conductive material. The conductive member distributes electrons to the porous, conductive material which in turn transfers electrons to or from the reactants.

The improvement disclosed in the patent application comprises designing the cathodic reaction zone of the device such that there are a plurality of channels and/or spaces within said zone which are free of porous conductive electrodes and which are thus adapted to allow free flow of the cathodic reactants during operation of the device. This flow results from free connection within the channels and/or spaces and from wicking of cathodic reactants within the conductive porous material.

U.S. Pat. application Ser. No. 567,464 filed Apr. 14, 1975 in the name of Robert Minck et al, discloses an improved method for recharging secondary batteries or cells of the above-described type. The process involves maintaining a temperature gradient within the cathodic reaction zone during recharging such that the temperature of the cathodic reactants in a first region adjacent the solid electrolyte or cation-permeable barrier is sufficiently higher than the temperature of said reactants in a second region not adjacent the barrier such that sulfur in the first region boils and is transported to said second region where it condenses.

U.S. Pat. application Ser. No. 605,941 filed concurrently herewith in the name of Frank A Ludwig discloses improved cells or batteries of increased ampere-hour capacity, wherein the improvement comprises (a) employing a porous conductive electrode within the cathodic reaction zone of the cell or battery which will wick both molten sulfur and molten alkali metal polysulfides and which, in different regions of said cathodic reaction zone, exhibits different degrees of wettability by said alkali metal polysulfide, said electrode in a region adjacent to said cation-permeable barrier being more readily wetted by said polysulfide than is said electrode in a region further removed from said barrier such taht sulfur will boil near said barrier and condense away from it; (b) disposing the porous conductive electrode within the cathodic reaction zone of the cell or battery such that it forms and encloses one or more channels which extend from said region adjacent the cation-permeable barrier of the cell or battery outwardly into said region of the cathodic reaction zone which is further removed from the cation-permeable barrier; and (c) maintaining the amount of molten cathodic reactant in the cathodic reaction zone of the cell or battery such that the channels therein remain free of molten reactant and are thus adapted to transport sulfur vapor.

The prior art designs disclosed and claimed in the aforementioned U.S. Pat. and in Ser. No. 545,048 are effective in promoting distribution of reactants during both discharge and charge. However, even with these improved designs it is difficult to recharge the cells or batteries at high rates. The process of Ser. No. 567,464 overcomes some recharging problems associated with the above-discussed devices, but requires heating means within or adjacent the cathodic reaction zone to create a temperature gradient and the cell or battery contains no open passageways for vapor transfer, the vapor having to pass through molten reactants in the course of being transferred within the cell. Ser. No. 605,941 filed concurrently herewith, like the process of Ser. No. 567,464, increases the ampere-hour capacity of the batteries or cells by vapor transfer of sulfur within the cathodic reaction zone during recharging but eliminates the need for a temperature gradient and provides specific channels free of molten reactants for the transfer of sulfur vapor.

The improved device of this invention provides an alternative to the above devices and like the device of said concurrently filed application provides for the transfer of sulfur vapor without substantial interference by molten reactants. The device, unlike the device of said concurrently filed application, does employ a temperature gradient. However, the device demonstrates improved charging and discharging rates as a result of such temperature gradient.

BRIEF DESCRIPTION OF THE INVENTION

The improvement of this invention relates to modification of the structure of the prior art alkali metal/sulfur secondary battery or cell, which will be described hereinafter in greater detail, such that the cathodic reaction zone thereof is adapted to operate as a gas fuel cell electrode. The modification comprises employing a sulfur storage chamber containing molten sulfur and connected with said cathodic reaction zone so as to allow sulfur vapors to pass therebetween, said storage chamber being adapted to be heated or maintained at a temperature (i) above the temperature of said cathodic reaction zone when said cell is being discharged such that sulfur distills into said cathodic reaction zone and (ii) below the temperature of said cathodic reaction zone when said cell is being charged such that sulfur vapor condenses in said storage chamber. The invention also includes using the improved device of the invention to reduce alkali metal polysulfides to form elemental alkali metal by continuously feeding molten alkali metal polysulfides to the cathodic reaction zone while charging the cell. The invention will be more fully understood after reading the following detailed description thereof in conjunction with the drawings in which:

DETAILED DESCRIPTION OF THE INVENTION

Figure 1:
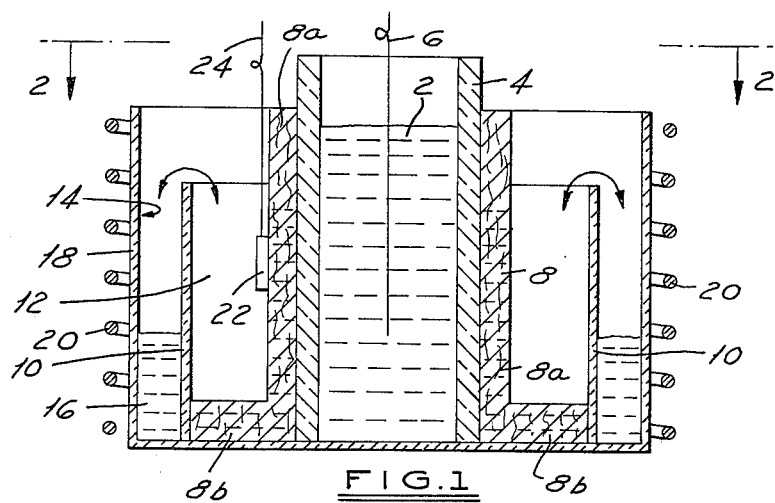
FIG. 1 shows a vertical cross-sectional view of a cell showing a preferred design in accordance with the invention.

Description of Device to Which Improvement Applies

The secondary or rechargeable electrical conversion devices to which the improvement of this invention applies, and various components thereof, are disclosed in the following U.S. Pat. Nos., the disclosures of which are incorporated herein by reference: 3,404,035; 3,404,036; 3,413,150; 3,446,677; 3,458,356; 3,468,709; 3,468,719; 3,475,220; 3,475,223; 3,475,225; 3,535,163; 3,719,531 and 3,811,493.

As mentioned above, the secondary batteries or cells to which the improvement of this invention applies comprise generally: (1) an anodic reaction zone containing a molten alkali metal reactant-anode in electrical contact with an external circuit; (2) a cathodic reaction zone including an electrode of porous conductive material and in which, during cell discharge, a cathodic reactant forms polysulfide ions which react with cations of said alkali metal to form reduced alkali metal polysulfide salts which at least partially fill said porous electrode; and (3) a cation-permeable barrier to mass liquid transfer interposed between and in contact with said anodic and cathodic reaction zones, said porous conductive material being in electrical contact with both said cation-permeable barrier and the external circuit.

The anodic reactant employed in such devices is an alkali metal which is maintained above its melting point when the device is in operation. The anodic reactant is heated by any conventional means including, not by way of limitation, Joule heating, induction heating, and heat exchange with a suitable fluid. The anodic reaction may also be viewed as the anode proper or conductor through which the electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alkali metals, or alloys containing such alkali metals can be used.

The cathodic reactant in the cells to which the improvement of this invention applies is sulfur. It has been the practice in the past for said sulfur to be included in said cathodic reaction zone in a molten state. Thus, as the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

Since in the fully discharged state the polysulfide melt is single phase in nature, the activity of sulfur is substantially less than unity when the mole fraction of sulfur is about 0.60 and approaches unity as the mole fraction approaches 0.72, the point at which the polysulfide is sulfur saturated. As the cell is recharged, elemental sulfur is formed momentarily on the surfaces of the porous electrode in the vicinity of the solid ceramic electrolyte. Since sulfur is nonconductive, the presence of elemental sulfur on the porous electrode could cause difficulty in continuing the recharging process. However, when the mole fraction of sulfur in the melt is between about 0.60 and about 0.72, i.e., the single phase region, the sulfur which forms on the surface of the porous electrode tends to react immediately with the polysulfide melt in the vicinity thereof to form a second polysulfide in which the molar ratio of sulfur to alkali metal is greater than 3:2. This process occurs until the molar ratio of sulfur to alkali metal is approximately 5.2:2. This is the point where the mole fraction of sulfur is approximately 0.72 and the open circuit voltage becomes constant.

As charging of the cell or battery continues, the sulfur saturated polysulfide will no longer react with elemental sulfur deposited on the porous electrode to form polysulfide having a greater mole ratio of sulfur to alkali metal. Thus, as the charging cycle continues the cathodic reactant becomes two phase in nature. One phase is elemental sulfur and the other is sulfur saturated alkali metal polysulfide in which the molar ratio of sulfur to alkali metal is about 5.2:2, with the mole fraction of sulfur in the cathodic reaction zone continually increasing as the recharging cycle progresses. It is in this region of the recharging cycle that substantial difficulties are confronted because of the formation of large amounts of nonconductive elemental sulfur on porous electrode surfaces. In fact, it is extremely difficult to recharge such secondary cells or batteries to any great extent past the point at which the polysulfide becomes saturated with sulfur and thus the deposition of elemental sulfur has a limiting effect on rechargeability.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000, preferably about 100 to about 1,000, microns have been found to be effective.

Both glasses and polycrystalline ceramic materials have been found suitable for use in such devices as the solid electrolyte or reaction zone separators. Among the glasses which may be used with such devices and which demonstrate an unusually high resistance to attack by molten alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65, preferably about 47 to about 58, mole percent sodium oxide, about 0 to about 30, perferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F.

The polycrystalline ceramic materials useful as reaction zone separators or solid electrolytes are bi- or multi-metal oxides. Among the polycrystalline bi- or multi-metal oxides most useful in the devices to which the process of this invention applies are those in the family of Beta-alumina all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al-O bond chains with sodium ions occupying sites between the aforementioned layers and columns. Among the numerous polycrystalline Beta-type-alumina materials useful as reaction zone separators or solid electrolyte are the following:

1. Standard Beta-type-alumina which exhibits the above-discussed crystalline structure comprising a series of layers of aluminum oxide held apart by layers of linear Al-O bond chains with sodium occupying sites between the aforementioned layers and columns. Beta-type-alumina is formed from compositions comprising at least about 80% by weight, preferably at least about 85% by weight of aluminum oxide and between about 5 and about 15 weight percent, preferably between about 8 and about 11 weight percent, of sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O \cdot 11Al_2O_3$. The second crystalline is $\beta''$-alumina which may be represented by the formula $Na_2O \cdot 6Al_2O_3$. It will be noted that the $\beta''$ crystalline form of Beta-type-alumina contains approximately twice as much soda (sodium oxide) per unit weight of material as does the Beta-alumina. It is the $\beta''$-alumina crystalline structure which is preferred for the formation of solid electrolytes or reaction zone separators for the device to which the improvement of this invention is applicable. In fact, if the less desirable beta form is present in appreciable quantities in the final ceramic, certain electrical properties of the body will be impaired.

(2) Boron oxide $B_2O_3$ modified Beta-type-alumina wherein about 0.1 to about 1 weight percent of boron oxide is added to the composition.

(3) Substituted Beta-type-alumina wherein the sodium ions of the composition are replaced in part or in whole with other positive ions which are preferably metal ions.

(4) Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

The cathodic electrode or porous conductive material is in electrical contact with the cation-permeable barrier and an external circuit. The conductive material is of significantly greater surface area than a solid cathode and may comprise any porous material which is electronically conductive and which is resistant to attack by reactants within the cathodic reaction zone. Among the materials which may be employed are felts or foams of graphite or vitreous carbons.

While the secondary cells or batteries to which the improvement of this invention is applicable may have a number of different configurations, several of which are disclosed in the above-incorporated patents, a preferred configuration comprises: (1) an anodic reaction zone disposed in the center of said cell and containing an anodic reactant-anode which is in electrical contact with an external circuit; (2) a cation-permeable barrier to mass liquid transfer surrounding said anodic reaction zone; and (3) a cathodic reaction zone surrounding said barrier, said zone including an electrode of porous conductive material and, during charge or discharge of said cell, polysulfide salts of said alkali metal which at least partially fill said porous conductive material, said material being in contact with both said cation-permeable barrier and said external circuit. Still more preferably, the reaction zones and the barrier are concentrically disposed with respect to each other within the cell. Most preferably the reaction zones and the barrier are tubular and concentrically disposed.

IMPROVEMENT OF THE INVENTION

The improved cells or batteries in accordance with the invention serve to overcome difficulties caused by formation of elemental sulfur on the porous electrode surface near the solid ceramic electrolyte. The improvement comprises adapting the cathodic reaction zone to operate as a gas fuel cell electrode by employing a sulfur storage chamber containing molten sulfur connected with said cathodic reaction zone so as to allow sulfur vapors to pass therebetween, said storage chamber being adapted to be heated (i) to a temperature above the temperature of said cathodic reaction zone when said cell is being discharged such that sulfur distills into said cathodic reaction zone and (ii) to a temperature below the temperature of said cathodic reaction zones when said cell is being charged such that sulfur vapor condenses in said storage chamber.

Figure 2:
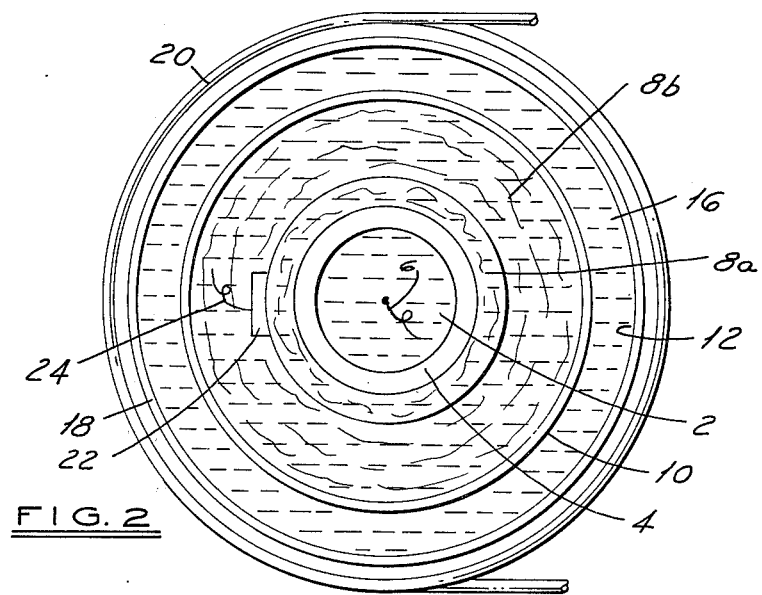
FIG. 2 is a cross-sectional view taken along line 2—2 of FIG. 1.

The improvement of this invention will be more particularly described with reference to the drawing. FIG. 1 is a vertical cross-sectional view of a preferred cell design. As shown in the cross-sectional view of FIG. 2 the cell is tubular. In the illustrated cell, molten alkali metal 2 such as sodium is located in the center of the cell and is surrounded by tubular cation permeable barrier 4 such as $\beta''$-alumina ceramic. Thus, the anodic reaction zone is circumscribed by barrier 4. Anodic reactant 2 is connected to an external circuit by lead 6. A ring of porous conductive material 8, e.g., porous graphite felt, is disposed around the outside of barrier 4, being in both physical and electrical contact therewith. Electrical contact 22 and lead 24 connect material 8 to an external circuit. Material 8 is shown with two sections of varying width, section 8a being reasonably narrow compared to section 8b. Section 8b is shown extending from barrier 4 to tubular wall 10. Wall 10 and barrier 4 constitute the outer and inner walls respectively of the cathodic reaction zone which is shown with an open region 12 free of reactants and porous conductive material 8 and contiguous with said material 8. This region is connected or continuous with sulfur storage chamber 14. Said chamber 14 which contains molten sulfur 16 is defined by outer cell wall 18 and tubular wall 10. A coil heating or cooling means 20 is shown disposed about said cell next to the sulfur storage zone.

As discussed above, during the discharge cycle of the cells to which the improvement of this invention relates, electrons are accepted by polysulfide ions (i.e., reduced polysulfide ions are formed) in the vicinity of the interface between barrier 4 and porous conductive material 8. Thus, in order for the cell to discharge at a high rate it is necessary that sulfur be supplied to said porous conductive material 6 so that it can chemically react with the reduced polysulfide ions to reform oxidized polysulfide ions. The sulfur is thus serving as the electrode depolarizer. The cell of the invention, on discharge, operates such that the temperature of sulfur storage chamber 14 is greater than the temperature of the cathodic reaction zone. This temperature differential may be established by using coil 20 to heat chamber 18. Since the cell is closed and free of gases other than sulfur, it operates at the vapor pressure of sulfur and the sulfur vapor distills from chamber 14 into the cathodic reaction zone and into porous conductive material 8. Polysulfide salts formed during discharge remain in porous conductive material 8. As the salts accumulate they will fill both sections 8a and 8b of the material. Section 8b is larger in volume and acts as a polysulfide storage area. The volume of porous conductive material 8 is chosen such that it can store all of the polysulfide salts generated during a full discharge of the cell. However, the temperature difference between chamber 14 and material 8 should be controlled so that the rate of distillation does not exceed the rate of polysulfide reduction. Otherwise the sulfur will condense in region 8b. This lowers the efficiency of the cell.

During the charging cycle of the battery sulfur storage chamber 14 is maintained at a temperature below that of the cathodic reaction zone such that free sulfur will condense into chamber 14. When the cells to which the improvement of this invention applies are being charged, sulfur-saturated polysulfide forms on the surface of the porous electrode 8 near the cation permeable barrier 4. A separate liquid phase of sulfur is not obtained because the sulfur vaporizes from the sulfur-saturated polysulfide phase and distills into the cooled storage chamber 14. As section 8a is depleted of sulfur by vaporization and of sodium ions by their passage through the cation-permeable barrier, additional polysulfide is fed from polysulfide storage zone 8b into electrode region 8a by wicking and capillary action. The wicking can proceed by two different methods.

In the first method, storage zone 8b as shown in FIG. 1 is never completely filled with polysulfide. Therefore, for optimal efficiency in wicking to move polysulfide into region 8a, this region should be preferentially wet by polysulfide. This may be achieved by employing porous materials of different wettabilities in regions 8a and 8b. If the porous conductive material is graphite felts, then the graphite in 8a is modified by coating its surface with materials of polar or ionic character or with unfilled d-orbitals. Such materials include oxides and sulfides of metals selected from: (a) Groups I, II and III of the Periodic Table of Elements; (b) Transition Series Metals; and (c) tin, lead, antimony and bismuth. Preferably the metal salts or oxides are highly insoluble in the polysulfide so that redistribution of the coating does not occur. Preferred materials for coating are: aluminum oxide ($Al_2O_3$), molybdenum disulfide ($MoS_2$) chromic oxide ($CrO_3$), lanthanum chromite ($LaCrO_3$), calcium doped lanthanum chromite ($La_{1-x}Ca_xCrO_3$) and antimony pentoxide doped tin oxide $Sb_2O_5$-$SnO_2$). These materials are highly insoluble in polysulfide. Some other materials, such as iron disulfide ($FeS_2$), are somewhat more soluble and therefore less preferable. The materials can be applied to the surface of the graphite felt by methods such as the thermal decomposition of unstable salts such as the nitrates or by the use of stable inorganic "glues" such as finely dispersed alumina. (An alumina "glue" available commercially is sold under the registered trademark "Dispal" by the Continental Oil Company of Peterborough, New Jersey and contains: 90% α-alumina monohydrate; 9% water; .5% carbon as primary alcohols; .008% silica; .005% iron oxide; .004% soda; and .005% sulfur.) This "Dispal" is applied as a 10% aqueous dispersion including 1% concentrated hydrochloric acid so that it only partially coats the graphite surface. The modified graphite encourages the wicking of polysulfide and the vaporization of sulfur.

Figure 3:
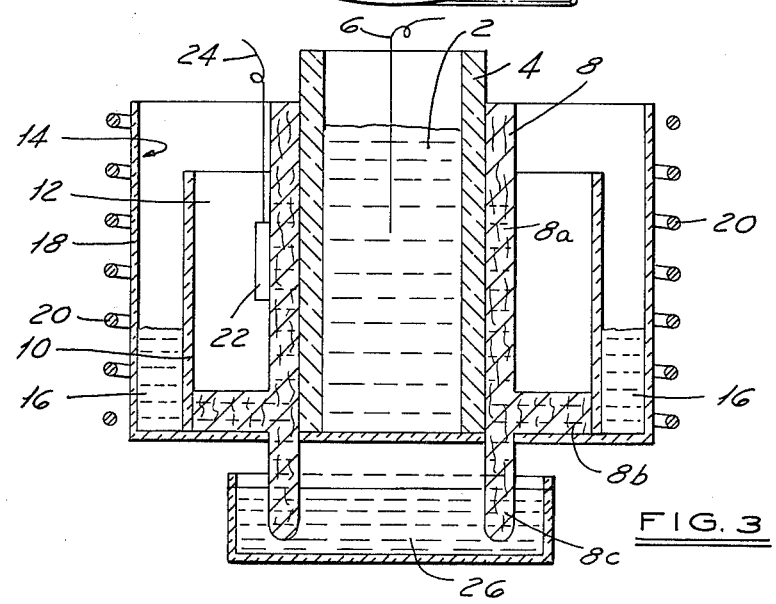
FIG. 3 is a vertical cross-sectional view of a preferred design of a cell which may be charged continuously in order to reduce alkali metal polysulfide salts and form elemental alkali metal.

The second method may be described in terms of FIG. 3, which shows another preferred design of a cell embodying the improvement of this invention. In addition to the features common with the device of FIG. 1, the cell includes another polysulfide storage zone 26 which comprises a liquid pool exterior to the cell. This pool is connected to region 8a of porous material 8 by section 8c which serves to draw the molten salts from the pool by wicking and capillary action. Therefore, polysulfide can be continuously wicked into region 8a, and region 8b is no longer functional, and need not be present.

The cell shown in FIG. 3 may be adapted readily for use in a process of reducing alkali metal polysulfide salts which may form in other processes such as coal or oil desulfurization, into elemental alkali metals. Thus, the alkali metal polysulfide to be reduced may be continuously fed into pool 26 and the cell operated on a continuous charge cycle.

The ready removal of pure sulfur from the process cycle is a distinct advantage of the gas electrode. If the cell is operated on a continuous charge cycle, as in a coal or oil desulfurization process, still further advantages can be achieved by using stainless steels as the porous, conductive material. It has been found that stainless steels (preferably SS No. 446), which exhibit outstanding conductivity, are also anodically protected in polysulfide melts, and therefore do not appreciably corrode. Thus, in this preferred process variation the porous electrode can be either stainless steel felt, porous stainless steel metal or perforated stainless steel sheet in physical contact or in close proximity to the cation-permeable barrier.

The following examples are merely intended to be representative of cells which may be prepared and operated in accordance with the teachings of this invention and should not be construed as limiting in any way.

EXAMPLE I

A cell similar to FIG. 1 is constructed using a pyrex container. A 1 cm O.D. by 1 inch long $''$-$Al_2O_3$ tube, closed at the bottom, is joined to α-$Al_2O_3$ tube and thence to a Corning No. 7052 glass sodium compartment. The $\beta''$-$Al_2O_3$ tube is wrapped with two layers of graphite cloth* which is soaked prior to wrapping in a 10% aqueous dispersion of "Dispal" including 1% hydrochloric acid and then dried so as to partially coat the cloth with alumina. This pretreatment modifies the cloth to produce preferential wetting by polysulfides of region 8a with respect to 8b. Two graphite bands are placed at positions approximately ⅓ to ⅔ up the height of the 1″ $\beta''$-$Al_2O_3$ tube, over the cloth so as to hold it in place and also to serve as current leads. The graphite bands are 3/32 inch × 3/32 inch in width and are cemented to thin 3/32 inch diameter graphite rods leading to the external circuit using "Dylon" or other graphite cement. The pyrex wall of the cell 10 is 24 mm I.D.. The bottom ¼ inch of the cell is filled with graphite felt (region 8b). It is in contact with wall 10 and the graphite cloth. A thin glass plate lies on top of the felt to minimize contact with open region 12. Two pyrex tubes, 5 mm I.D. exit from the top of the 1½ inch high pyrex body 10 and lead to an external pyrex cell of about the same volume as cell 10. Cell 10 and the external cell are controlled by separate heaters so that their temperatures can be adjusted individually. The connecting tubes between the cells are wrapped with heating tape so that their temperatures can be controlled at intermediate levels between the two cell temperatures. The sodium compartment is filled with sodium in the conventional manner. The pyrex cells are evacuated and the external cell is filled with slightly less sulfur than needed to saturate the graphite regions 8a and 8b. The pyrex cell 10 is heated to 325° C and the external cell is slowly heated to 400° C, as the cell is discharged. The upper temperature is raised for very high discharge rates. On charge the pyrex cell 10 is kept at 325° C, but the external cell is allowed to drop to 140° C. The connecting tubes between the two cells are kept short so as to minimize the lengths required for vapor transport.

EXAMPLE II

A cell similar to that of Example I is constructed with several modifications. Graphite felt 8*b* is eliminated and the covering glass plate is retained ¼ inch up from the bottom of the cell by connecting it to wall 10 and extending it to but not in contact with the graphite cloth. The cell is operated in the same manner as in Example I. A liquid polysulfide pool collects in the bottom of the cell upon discharge as excess polysulfide runs down the outside of the graphite cloth. On charge the liquid polysulfide is wicked to the electrode from the pool.

EXAMPLE III

A cell similar to FIG. 3 is constructed. Porous material 8*a* and 8*c* is a stainless steel No. 446 perforated sheet 0.025 inch thick, the perforations removing about 40% of the sheet area. The sheet is formed into a cylinder and fitted snugly about a 1.0 cm O.D. by one inch long $\beta''-Al_2O_3$ tube. A stainless steel lead extends from the cylinder to an external circuit. The outer wall of the cathodic reaction zone is a pyrex cell 2.0 cm I.D. The SS No. 446 electrode extends into a polysulfide pool located along the lower ¼ inch of the $\beta''-Al_2O_3$ tube. The pyrex cell is constricted between the polysulfide pool and the cathodic reaction zone as in Examples I and II in order to control vapor phase contact with the pool. The small spaces between the $\beta''-Al_2O_3$ tube and the perforated sheet are relied upon to provide for the wicking of polysulfide between the pool and the cathodic reaction zone. Of course, porous sintered stainless steel or stainless steel cloth or felt could be used in place of the perforated sheet. The thickness of these alternative materials can be approximately .020 inch - .100 inch. The exterior pyrex cell and connecting tubes are as in Examples I and II. The exterior cell is kept at 140° C and has a teflon stopcock so that excess sulfur can be with drawn under vacuum as the cell is charged continuously. The pyrex cell 10 is operated at 325° C. The polysulfide pool connects to a continuous polysulfide source via a needle valve. Such a cell may be run continuously to produce alkali metal' from alkali metal polysulfide salts.

In view of this disclosure, many modifications of this invention will be apparent to those skilled in the art. It is intended that all such modifications which fall within the scope of this invention be included within the terms of the appended claims.

I claim:
1. In an alkali metal/sulfur cell comprising:
   A. One or more anodic reaction zones containing a molten alkali metal reactant-anode in electrical contact with an external circuit;
   B. One or more cathodic reaction zones including an electrode of porous conductive material and in which, during discharge of said cell, cations of said alkali metal combine with polysulfide ions to form alkali metal polysulfide salts which at least partially fill said porous conductive material; and
   C. A cation-permeable barrier to mass liquid transfer interposed between and in contact with said anodic and cathodic reaction zones, said porous conductive material being in electrical contact with both said cation-permeable barrier and said external circuit, wherein the improvement comrpises at least one cathodic reaction zone which is adapted to operate as a gas fuel cell electrode by employing a sulfur storage chamber containing molten sulfur connected with said cathodic reaction zone so as to allow sulfur vapors to pass therebetween, said storage chamber being adapted to be maintained at a temperature (i) above the temperature of said cathodic reaction zone when said cell is being discharged such that sulfur distills into said cathodic reaction zone and (ii) below the temperature of said cathodic reaction zone when said cell is being charged such that sulfur vapor condenses in said storage chamber.

2. A device in accordance with claim 1, wherein a first surface of said electrode of porous material is disposed adjacent to and in contact with said cation-permeable barrier.

3. A device in accordance with claim 2 wherein said cathodic reaction zone includes an open region adjacent to a second surface of said porous material opposite said first surface, which open region is free of said polysulfide salts and is connected with said sulfur storage chamber so as to allow sulfur vapor to pass there between.

4. A device in accordance with claim 3, wherein said electrode of porous material is of such a thickness as will allow sulfur to readily pass from said material into said open region and vice versa.

5. A device in accordance with claim 1, wherein said cell includes a polysulfide storage zone adapted to feed molten polysulfide salts to said porous material adjacent said barrier during the charging cycle of said cell.

6. A device in accordance with claim 5, wherein said molten polysulfide salts are fed into said porous material by wicking and capillary action.

7. A device in accordance with claim 5, wherein said polysulfide storage zone is located within said cathodic reaction zone, comprises the same porous material as said electrode and is continuous therewith.

8. A device in accordance with claim 5, wherein said polysulfide storage zone comprises a pool of molten polysulfide salts into which said electrode of porous material in partially immersed.

9. A device in accordance with claim 8, wherein said pool is within said cathodic reaction zone.

10. A device in accordance with claim 8, wherein said pool is outside said cathodic reaction zone.

11. A device in accordance with claim 8, wherein said pool is adapted to be replenished continuously with molten polylsulfide so that said cell may be employed to separate alkali metal from its polysulfide salts by continuously charging said cell.

12. A device in accordance with claim 1, wherein said electrode of porous conductive material is preferentially wet by said polysulfide salts.

13. A device in accordance with claim 12, wherein said porous conductive material is graphite felt, the surfaces of which have been partially coated with an oxide or sulfide of a metal selected from the group consisting of: (a) metals of Groups I, II and III of the Periodic Table of Elements; (b) Transition Series Metals; and (c) tin, lead, antimony and bismuth.

14. A device in accordance with claim 13, wherein said graphite felt is coated with a material selected from the group consisting of: aluminum oxide ($Al_2O_3$), molybdenum disulfide ($MoS_2$), Chromic oxide ($CrO_3$), lanthanum chromite ($LaCrO_3$), calcium doped lanthanum chromite ($La_{1-x}Ca_xCrO_3$) and antimony pentoxide doped tin oxide ($Sb_2O_5-SnO_2$).

15. In an alkali metal/sulfur cell comprising:

A. An anodic reaction zone disposed in the center of said cell and containing an anodic reactant-anode which is in electrical contact with an external circuit;
B. A cation-permeable barrier to mass liquid transfer surrounding said anodic reaction zone; and
C. A cathodic reaction zone surrounding said barrier, said zone including an electrode of porous conductive material and in which, during discharge of said cell, cations of said alkali metal combine with polysulfide ions to form alkali metal polysulfide salts which at least partially fill said porous conductive material, said material being in electrical contact with both said cation-permeable barrier and said external circuit, wherein the improvement comprises a sulfur storage chamber containing molten sulfur surrounding said cathodic reaction zone and connected therewith so as to allow sulfur vapor to pass therebetween, said storage chamber being adapted to be maintained at a temperature (i) above the temperature of said cathodic reaction zone when said cell is being discharged such that sulfur distills into said cathodic reaction and (ii) below the temperature of said cathodic reaction zone when said cell is being charged such that sulfur vapor condenses in said storage chamber.

16. A device in accordance with claim 14, wherein said reaction zones, said barrier and said storage chamber are concentrically disposed within said cell.

17. A device in accordance with claim 15, wherein said cell includes a polysulfide storage zone adapted to feed molten polysulfide salts to said porous material during the charging cycle of said cell.

18. A device in accordance with claim 17, wherein said molten polysulfide salts are fed into said porous material by wicking and capillary action.

19. A device in accordance with claim 17, wherein said polysulfide storage zone is within said cathodic reaction zone.

20. A device in accordance with claim 17, wherein said polysulfide storage zone is outside said cathodic reaction zone and is adapted to be replenished continuously with molten polysulfide.

21. A device in accordance with claim 15, wherein said electrode of porous conductive material is preferentially wet by said polysulfide salts.

22. A device in accordance with claim 21 wherein said porous conductive material is graphite felt, the surfaces of which have been partially coated with an oxide or sulfide of a metal selected from the group consisting of: (a) metals of Groups I, II and III of the Periodic Table of Elements; (b) Transition Series metals; and (c) tin, lead, antimony and bismuth.

23. A device in accordance with claim 22 wherein said graphite felt is coated with a material selected from the group consisting of aluminum oxide ($Al_2O_3$), molybdenum disulfide ($MoS_2$), chromic oxide ($CrO_3$), lanthanum chromite ($LaCrO_3$), calcium doped lanthanum chromite ($La_{1-x}Ca_xCrO_3$) and antimony pentoxide doped tin oxide ($Sb_2O_5$-$SnO_2$)

24. A process for reducing alkali metal polysulfide salts to form elemental alkali metal comprising feeding molten alkali metal polysulfide salts into a cathodic reaction zone of an alkali metal/sulfur cell, which cell comprises:
A. One or more anodic reaction zones containing a molten alkali metal reactant-anode in electrical contact with an external circuit;
B. One or more cathodic reaction zones including an electrode of porous conductive material and in which, during discharge of said cell, cations of said alkali metal combine with polysulfide ions to form alkali metal polysulfide salts which at least partially fill said porous conductive material;
C. a cation-permeable barrier to mass liquid transfer interposed between and in contact with said anodic and cathodic reaction zones, said porous conductive material being in electrical contact with both said cation-permeable barrier and said external circuit; and
D. a sulfur storage chamber containing molten sulfur which is connected to said cathodic reaction zone so as to allow sulfur vapor to pass therebetween, said storage chamber being adapted to be maintained at a temperature (i) above the temperature of said cathodic reaction zone when said cell is being discharged such that sulfur distills into said cathodic reaction zone and (ii) below the temperature of said cathodic reaction zone when said cell is being charged such that sulfur vapor condenses in said storage chamber, said salts being fed into said cathodic reaction zone while said cell is in a constant charging state so that alkali metal ions and free sulfur are formed near the surface of said barrier, the sulfur passing through said electrode and into said sulfur storage chamber and said alkali metal cation migrating through said barrier to said anodic reaction zone where elemental alkali metal is formed by acceptance of an electron.

25. A process in accordance with claim 24 wherein said alkali metal polysulfide is fed to said cathodic reaction zone from a polysulfide storage zone.

26. A process in accordance with claim 25 wherein said storage zone is outside said cathodic reaction zone and said storage zone is constantly replenished such that molten polysulfide can be continuously fed into said cathodic reaction zone.

27. A process in accordance with claim 26 wherein said molten polysulfide is fed into said cathodic reaction zone by wicking into said porous material which extends from said cathodic reaction zone into said polysulfide storage zone.

* * * * *